United States Patent Office 2,905,421
Patented Sept. 22, 1959

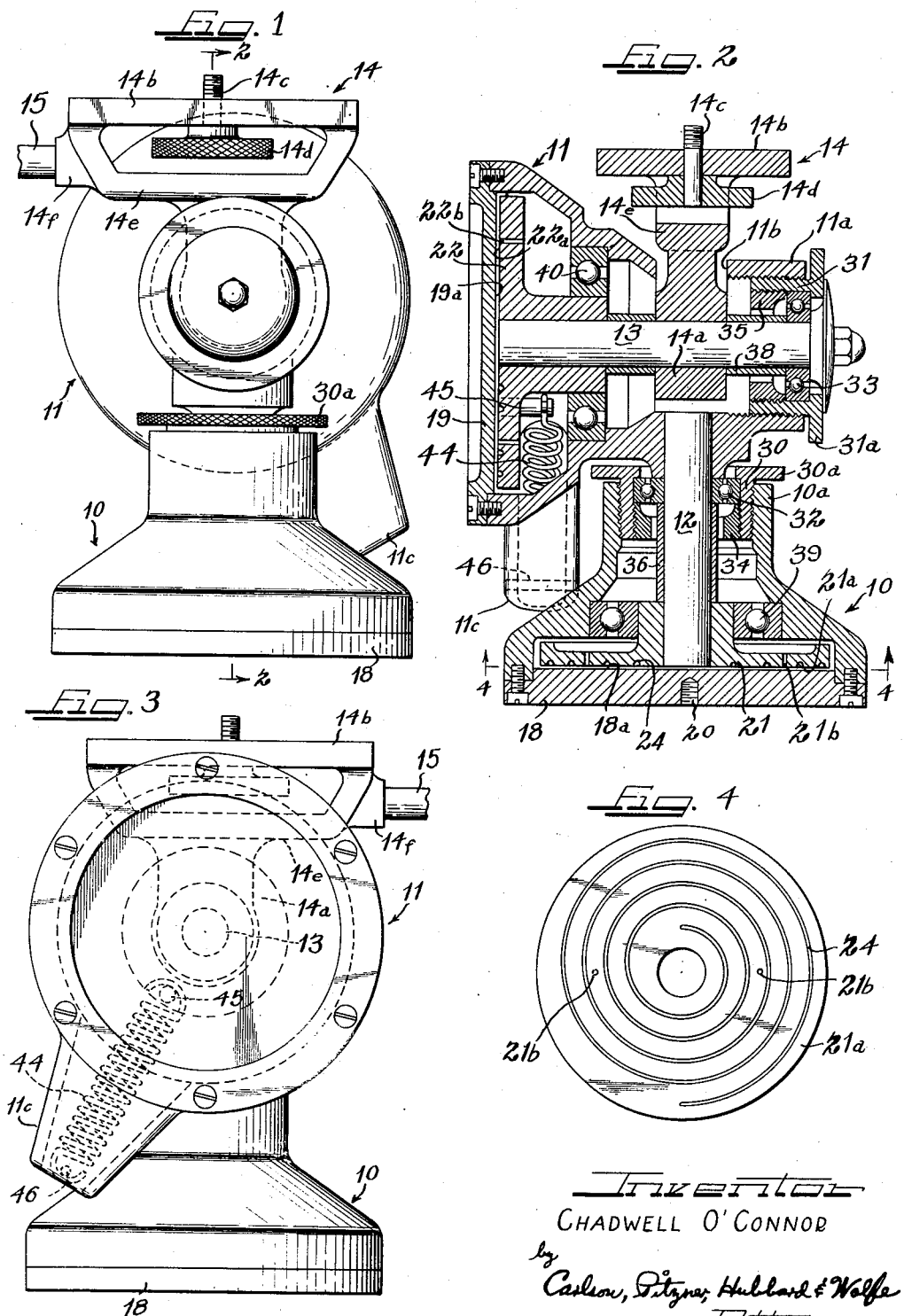

2,905,421

PAN HEAD

Chadwell O'Connor, Pasadena, Calif.

Application March 29, 1954, Serial No. 419,510

4 Claims. (Cl. 248—183)

The present invention pertains to pan heads for mounting cameras or like instruments for smooth scanning movement, and more particularly, has to do with improvements in such pan heads yielding reliable performance under widely varying conditions.

In motion picture photography or television pickup, it is often necessary to sweep a camera about a horizontal or vertical axis, or both, in order to cover a wide scene or to follow an object as it moves along a landscape or stage. It is highly desirable that such sweeping movement of the camera be smooth and uniform, else the resulting picture will be jerky and a moving object not properly centered at all times. The same problem is sometimes present in the use of telescopes, surveyors' transits, and other like instruments.

Various forms of pan heads have been employed in the past for mounting an instrument on a tripod or other support with freedom to move about one or more axes. And frictional drag between moving parts of the pan head has been employed to give some resistance to an operator's manual force in sweeping or "panning" the camera, and thus to prevent erratic movements. Such frictional drag has, in prior pan heads, caused "chatter" or jerky movements, varied with the speed of sweeping, or prevented sweeping above a predetermined rate. Additionally, temperature changes caused such variations in the drag that an operator could never become completely familiar with the "feel" of the pan head.

It is the general aim of the invention to eliminate those difficulties through the provision of a novel and improved pan head incorporating means for adjusting the drag between relatively moveable parts, thereby permitting the degree of drag to be made uniform under variable temperature conditions, and also permitting the drag to be increased for slow panning or decreased for fast panning as the occasion may require.

Another object of the invention is to provide an improved pan head in which a viscous substance is employed to create a drag by a shearing action thereon, and which has means for compensating for changes in the viscosity of such substance due to temperature variations.

It is a further object to provide a pan head which permits tilting of a mounted camera or instrument about a vertical axis but which automatically returns the instrument to a horizontal position when the tilting force is removed.

Other objects and advantages will become apparent as the following description proceeds, taken in conjunction with the accompanying drawing, in which:

Figure 1 is a front elevation of a pan head embodying the features of the present invention;

Fig. 2 is a vertical section taken substantially along the line 2—2 in Fig. 1;

Fig. 3 is a rear elevation of the pan head shown in Fig. 1; and

Fig. 4 is a detail view taken substantially along the line 4—4 in Fig. 2 and particularly illustrating the preferred formation of a reaction disk.

While the present invention has been shown and is described in some detail with reference to a particular embodiment thereof, there is no intention that it thus be limited to such detail. On the contrary, it is intended here to cover all modifications, alternative constructions, and equivalents falling within the spirit and scope of the invention as defined by the appended claims.

Referring now to the drawing, the exemplary pan head here illustrated as embodying the invention comprises as its basic components a primary base member 10, a secondary base member 11, and first and second spindles 12 and 13 which are vertically and horizontally journaled in the respective base members. The primary base member 10 is adapted for attachment to any suitable support such as a tripod (not shown) while a mount 14 is carried fast on the second spindle 13 and adapted to receive a camera or other instrument. A handle 15 (partially shown) extends from the mount 14 for rocking the latter with the spindle 13 about a horizontal axis for tilting or vertical panning, and for swinging the entire secondary base member 11 about the vertical axis of the first spindle 12 for horizontal panning. Freedom to point the instrument on the mount 14 in any direction, within predetermined limits about the horizontal axis, is thus afforded.

As shown in this instance, the primary and secondary base members 10 and 11 are hollow and somewhat bell-shaped, being closed at their larger ends by bottom and end closure plates 18 and 19 respectively. The latter present inner surfaces 18a and 19a which extend transversely to the respective axes of the base members 10 and 11. The bottom closure plate 18 is centrally drilled and tapped as at 20 in order that the entire pan head may be removably fixed on a tripod, as by means of the usual thumb screw. At their opposite ends, the base members terminate in neck portions 10a, 11a through which the respective spindles 12 and 13 extend.

It will be apparent that the secondary base member 11 is fixed fast on the upper end of the vertical spindle 12 so that the two may be rotated as a unit relative to the primary base member 10. Additionally, the medial portion of the secondary base member has an upper arcuate slot 11b through which an eye portion 14a of the mount 14 extends for rigid connection to the horizontal spindle 13.

For attaching a camera or other instrument to the mount 14, the latter includes a top plate 14b centrally apertured to receive an upwardly projecting screw 14c having a knurled thumb piece 14d located between the top plate 14b and a supporting bracket 14e integral with the eye portion 14a. The screw 14c is thus held captive in place and ready for threaded engagement with a camera or other instrument; it is readily rotatable by grasping the thumb piece 14d. For attaching the handle 15, the mount 14 further includes an integral socket formation 14f.

For the purpose of creating a reactive or dragging force opposing the rotation of the spindles 12 and 13 relative to their respective base members 10 and 11, the spindles are provided with flat, radially extending surfaces which are closely spaced from and parallel to the respective inner surfaces 18a and 19a of the closure plates 18 and 19. As shown in this instance, each of the spindles 12 and 13 carry reaction disks 21 and 22, respectively, such disks being made of a hard material such as metal as shown in the drawing, and having flat, transverse faces which are parallel to the surfaces 18a and 19a, and only slightly spaced therefrom. The closure plates 18, 19 and the respective reaction disks 21, 22 are adapted to receive therebetween a viscous substance which, owing to the close spacing of the surfaces 18a, 21a and 19a, 22a, sets up a reactive shear force which prevents abrupt changes in the speed of relative rotation between the spindles 12 and 13 and their respective base members. The viscous substance employed may be any one of a wide variety, examples being oil, grease, glycerine, and the like. The viscous substance is not illustrated in the drawings but its use will be readily understood. It may be easily contained within the two base members 10 and 11 with the closure plates fitted snugly in place as shown. In many applications, the viscous substance employed may be the same oil or grease which is used to lubricate the anti-friction bearings to be described.

In order for the desired reactive shear forces in the viscous substance to be operative in retarding abrupt or jerky movements of the spindles relative to their respective base members, the surfaces 18a, 21a and 19a, 22a, should be accurately machined and maintained in a high degree of parallelism. For example, the spacing between such surfaces may be in the order of a thousandth or a fraction of a thousandth of an inch so that if the surfaces are rough and contain irregularities, direct physical contact may result thereby creating a mechanical chatter and jerking movement.

In accordance with one feature of the invention, a high degree of shearing reaction is obtained in the viscous substance with a relatively great spacing between the surfaces 18a, 21a and 19a, 22a through the provision of a spiral groove in one of each set of such surfaces. As shown more particularly in Fig. 4, a spiral groove 24 is cut or otherwise formed in the surface 21a of the disk 21. A similar groove may be provided in the surface 22a. Since the groove 24 leaves more space between the surfaces 18a and 21a for a given displacement therebetween, a greater amount of viscous substance may be interposed between such surfaces. As the two surfaces rotate relative to one another, the viscous substance in the groove is forced radially between the successive portions of the groove. Accordingly, shear of the viscous substance occurs in a radial direction as well as a circular direction and the total reactive force created is greater than it would otherwise be. A steady reactive force against manual movement of the handle 15 is created which prevents the operator from swinging the mount 14 too fast or jerking it in scanning a scene or tracking a moving object.

The pan head as thus far described would work well enough if it were always employed in panning at one speed either about a horizontal axis, a vertical axis, or both; and if the temperature of the atmosphere where it is employed were constant. These conditions are rarely met in practice. It is often necessary to pan a camera or other instrument extremely fast in following an airplane or other fast-moving object, while perhaps in the next few moments it is necessary to pan very slowly in order to scan a landscape scene. Further, the pan head may be employed in temperatures ranging from below freezing to temperatures well over 100° F. Such a wide range of temperatures makes great changes in the viscosity of the substance employed to create reactive forces, thus changing the "feel" of the pan head and the speed with which it is moved for a given applied force on the handle 15.

In accordance with an important feature of the invention, adjustments in the drag caused by the viscous substance between the surfaces 18a, 21a and 19a, 22a are provided by means journaling the spindles 12 and 13 in such manner that they may be quickly and easily shifted axially to continuously and progressively vary the spacing between such surfaces. And, as will become apparent, such means not only permit variation in the spacing of the surfaces 18a, 21a and 19a, 22a, but also serve to positively maintain such surface spaced apart and free of mutual contact even though the viscous substance is absent. For, as explained above, it is the shearing action of the viscous material that creates the drag, not frictional contact which is smoothed by lubrication.

In the illustrated form, such means are embodied by intermediate members or sleeves 30, 31 threadably engaged in the respective neck portions 10a and 11a of the base members. The sleeves 30, 31 have radially extending knurled flanges 30a, 31a which are readily grasped between the thumb and forefinger of an operator and turned to effect axial threaded translation of the sleeves relative to their respective base members. Cooperating with such sleeves, and serving also to journal the spindles 12 and 13, are respective anti-friction ball bearings 32 and 33 which have their inner races fast on the respective spindles 12 and 13 and their outer races fast in the sleeves 30 and 31. For maintaining the outer races against axial movement within the sleeves 30 and 31, externally threaded rings 34 and 35 are screwed internally into the respective sleeves and hold the races in axial abutment against inturned sleeve lips. The inner race of the bearing 32 is restrained against axial translation relative to its spindle 12 by a bushing 36 disposed on the spindle and engaging such inner race at one end and the reaction disk 21 at the other end. A similar sleeve 38 maintains the inner race of the bearing 33 in axial position on the spindle 13, the bushing 38 bearing at its left end (Fig. 2) against the eye portion 13a.

From the foregoing it will be clear that simply by turning the sleeves 30 and 31 the respective spindles 12 and 13 may be shifted axially within the support members 10 and 11 to adjust smoothly the spacing between the surfaces 18a, 21a and 19a, 22a. Preferably the cooperative threads between the sleeves 30, 31 and the respective neck portions 10a, 11a are fine in pitch since the requisite variations in spacing between the cooperating reaction surfaces are slight. Also, in order to eliminate "suck" created by the viscous substance as the disks 21, 22 are axially separated from the respective closure plates 18 and 19, these disks are preferably provided with a series of small axial holes 21b, 22b which permit the destruction of any vacuum which might be created upon such separation.

In addition to the precision anti-friction bearings 32 and 33, the spindles 12 and 13 are journaled by larger axially spaced anti-friction ball bearings 39 and 40, respectively. These latter bearings have outer races seated in recesses formed within the base members 10 and 11, and their inner races fixed to but axially slidably along an inturned collar for the respective reaction disks 21 and 22. The combination of the double anti-friction bearing support for each of the spindles 12 and 13 assures that the cooperative reaction surfaces 18a, 21a and 19a, 22a are maintained accurately in parallelism as the pan head is used so that the reactive forces created by the viscous substance between such surfaces is uniform for a given selected spacing of the surfaces.

In the use of a pan head of the type here shown, it may often happen that the weight of a camera or other instrument placed on the mount 14 is off center slightly and tends to rock the mount and spindle 13 relative to the secondary base member 11. Thus, unless the handle were held by the operator at all times, the camera would not remain level but would tilt downwardly in one direction or the other until the mount 14 reached the end of its travel in the slot 11b. In order to overcome this difficulty and to yieldably maintain the mount 14 in level position, spring means are connected between the secondary base member 11 and the spindle 13 to bias the latter to a predetermined rotational position, e.g., that in which the mounting base 14b is horizontal.

As shown in this instance, such automatic counterbalancing means are provided in the form of a coiled tension spring 44 which is connected at one end to a pin 45 seated in the disk 22 and at the other end to a pin 46 fastened in the end of a radially extending integral pocket 11c formed in the base member 11. With the spring 44 thus extending radially of the spindle 13 (Fig. 3), it tends always to radially aline the pins 45 and 46 so that the mount plate 14b is horizontal. Yet, the operator may vertically pan or tilt the mount 14, and any instrument on it, simply by appropriately moving the handle 15 so that the spindle 13 is rotated in its bearings against the force of the tension spring 44. After the mount 14 has been tilted downwardly, the operator may release the handle 15 and let the spring slowly return the mount 14 to a level position, the spring acting against the reactive shear force created in the viscous substance between the closely spaced and parallel surfaces 19a and 22a.

It is believed that the numerous advantages and convenient operation of the illustrative pan head will be clear from the foregoing description. However, in summary it may be stated that through the provision of the thumb operated adjusted sleeves 30 and 31, the two spindles 12 and 13 may be shifted axially to increase or decrease the spacing between the cooperative surfaces 18a, 21a and 19a, 22a. Increasing or decreasing such spacing correspondingly decreases or increases the reactive shear forces created in the viscous substance between such surfaces. Accordingly, when an operator desires to pan at a fast speed, he may simply increase the spacing between such surfaces and may pan at a rapid rate with a relatively slight force on the handle 15. Nevertheless, the panning will be smooth and uniform since the viscous substance prevents sudden or jerky displacements between the base members and their respective spindles. Similarly when the pan head is employed in extremely hot or cold temperatures the viscosity of the substance employed between the reactive surfaces may decrease or increase considerably. In order to compensate for this and to give the pan head the usual "feel," it is only necessary for the operator to adjust the sleeves 30 and 31 to reduce or increase the spacing between the reactive surfaces 18a, 21a and 19a, 22a. It is to be noted that the change in spacing is continuous rather than by intermittent steps so that the operating characteristics may be adjusted precisely for any operating condition.

Since in many instances the spacing between the cooperative reactive surfaces may be extremely slight in order to achieve the magnitude of reactive force required, provision is made for increasing such reactive force for given spacing by forming a spiral groove, such as the groove 24, in one of each pair of surfaces. Finally, the mount 14 is yieldably biased to a level position by spring means such as the tension spring 44 so that it will return to such horizontal position when tilted downwardly in vertically panning or will maintain such level position while the pan head is idle or being swept about the vertical axis of the spindle 12. A highly compact and reliable pan head is thus achieved, being operable under widely varying temperature conditions and at any desired panning speed.

I claim as my invention:

1. A pan head for supporting cameras or the like comprising, in combination, a primary hollow base member including a bottom closure plate adapted for attachment to a support structure, a first spindle projecting vertically from said primary base member and having on its lower end a disk presenting a spirally grooved surface parallel to and closely spaced from the upper surface of said bottom closure plate, means for journaling said first spindle in said primary base member including a first sleeve threadably engaged in the upper entrance to said primary base member and an anti-friction bearing having its outer and inner races fixed respectively to said first sleeve and first spindle to thereby afford changes in the spacing between said surfaces upon threaded movement of the sleeve, a secondary hollow base member horizontally disposed on the upper end of said first spindle and having an end closure plate, a second spindle horizontally disposed in said secondary base member and having on one end a disk presenting a spirally grooved surface parallel to and spaced from the inner surface of said end closure plate, means for journaling said second spindle in said secondary base member including a second sleeve axially threaded into said secondary base member and an anti-friction bearing having its outer and inner races fixed respectively to said second sleeve and second spindle to thereby afford changes in the spacing between said end plate and disk surfaces, a tension spring connected between the secondary base member and the disk therein to yieldably urge said second spindle to a predetermined rotational position, and a mount fixed to said second spindle and adapted for the attachment of a camera or the like thereto, the spaces between said bottom and end closure plates and their respective disks being adapted to receive a viscous substance for creating a drag opposing rotation of said first and second spindles relative to the respective primary and secondary base members.

2. In a pan head for supporting an instrument such as a motion picture camera, the combination comprising a base having means for effectively attaching the same to a stand, said base being shaped to define a housing adapted to contain a viscous substance, a spindle having a disk disposed within said housing and presenting a substantially flat surface at right angles to and of greater diameter than said spindle, said base having a substantially flat inner surface within said housing parallel to said disk surface, means for effectively attaching the instrument to said spindle, means for maintaining said surfaces spaced apart and entirely free of mutual contact in the absence of viscous substance in said housing and for affording smooth adjustment of the spacing between said surfaces, said last-named means including a bearing axially fast on said spindle, an intermediate member axially fast on said bearing, and a connection between said member and said base permitting adjustment of the former relative to the latter lengthwise of said spindle, so that upon adjustment of said member the spacing of said surfaces is adjusted to change the drag against relative rotation of said base and spindle created by circular shearing action on a viscous substance between said surfaces.

3. In a pan head for supporting an instrument such as a motion picture camera, the combination comprising a base having means for attaching the same to a stand, said base being shaped to define a housing adapted to contain a viscous substance, a spindle, means including a bearing axially fast on said spindle for journaling the latter in said base, means including a sleeve axially fast to said bearing and having threaded engagement with said base for movement in a direction lengthwise of the spindle so that the latter may be adjusted axially within the base, said spindle having a disk disposed within said housing and presenting a substantially flat surface at right angles to and of greater diameter than said spindle, said base having a substantially flat inner surface within said housing parallel to said disk surface, said bearing and sleeve constituting means for maintaining said surfaces spaced apart and entirely free of mutual contact in the absence of viscous substance in said housing and also constituting means for smoothly adjusting the spacing between said surfaces to change the resistance to relative rotation of said base and spindle due to circular shearing action in the viscous substance, whereby the panning drag may be adjusted to the desired value despite changes in the temperature affecting the viscosity of the substance.

4. The combination set forth in claim 2 further characterized in that one of said substantially flat surfaces is formed to define a groove of spiral configuration about the axis of the spindle, so that upon relative rotation of said surfaces a viscous substance therebetween is subjected to both circular shearing and radial shearing to create drag opposing such rotation.

(References on following page)

References Cited in the file of this patent

UNITED STATES PATENTS

| | | |
|---|---|---|
| 1,764,407 | Howell | June 17, 1930 |
| 1,898,469 | Tonsor | Feb. 21, 1933 |
| 2,012,628 | Howell | Aug. 27, 1935 |
| 2,164,051 | Brunson | June 27, 1939 |
| 2,459,040 | Miller | Jan. 11, 1949 |
| 2,514,137 | O'Connor | July 4, 1950 |
| 2,536,481 | Winchell | Jan. 2, 1951 |
| 2,582,779 | Hoge | Jan. 15, 1952 |
| 2,607,548 | Hollander | Aug. 19, 1952 |
| 2,717,138 | Sheenan | Sept. 6, 1955 |
| 2,743,792 | Ransom | May 1, 1956 |

FOREIGN PATENTS

| | | |
|---|---|---|
| 428,025 | Great Britain | May 3, 1935 |

OTHER REFERENCES

Edser, General Physics for Students McMillan Co., New York, 1920 (Copy in Div. 52).